J. Barnes,
Bed Bottom.
No. 52,658. Patented Feb 20, 1866.
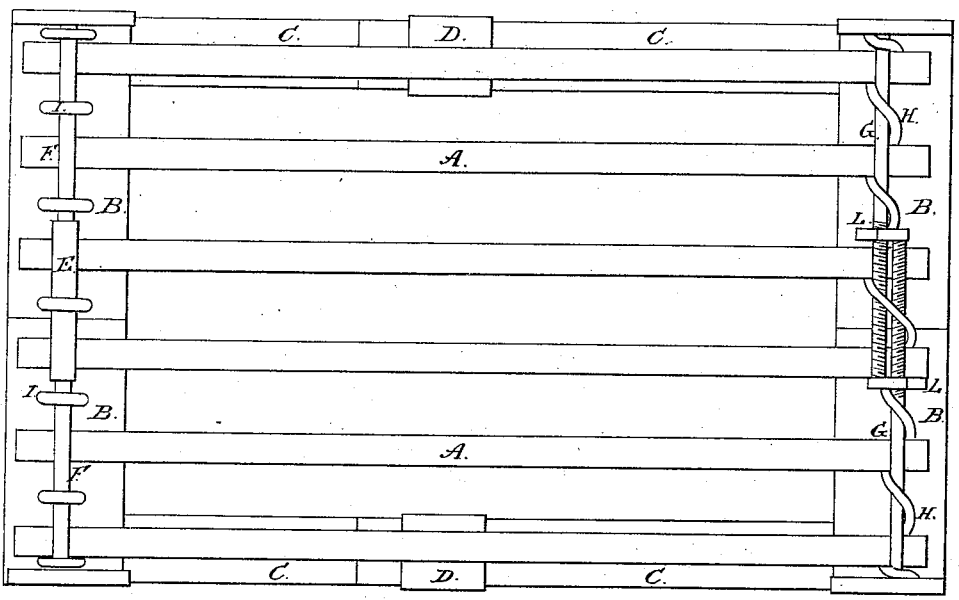
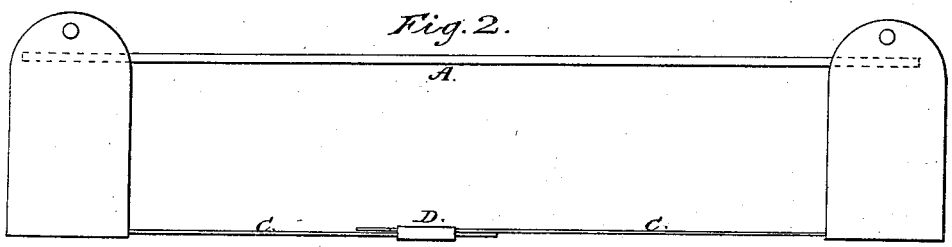
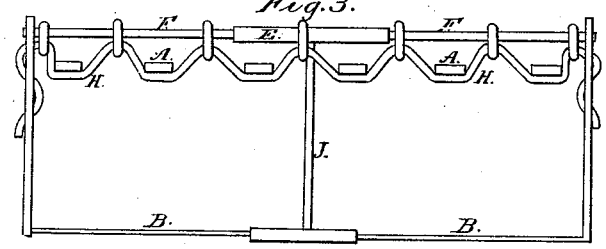
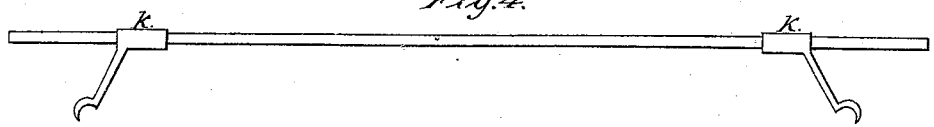
Witnesses;
O. G. Warren
J. D. Sturtevant
Inventor;
Joshua Barnes

UNITED STATES PATENT OFFICE.

JOSHUA BARNES, OF NEW YORK, N. Y.

IMPROVED SPRING BED-BOTTOM.

Specification forming part of Letters Patent No. 52,658, dated February 20, 1866; antedated February 5, 1866.

*To all whom it may concern:*

Be it known that I, JOSHUA BARNES, of the city, county, and State of New York, have invented a new and useful Improvement in Spring Bed-Bottoms; and I hereby declare that the following is a full and exact description thereof.

To enable others skilled in the business to make and use my invention, I proceed to describe its construction and operation, reference being had to the drawings hereunto annexed and making part of this specification.

Figure 1 is a plan, showing position of the bars; Fig. 2, side elevation; Fig. 3, end elevation, and Fig. 4 one of the slots with the adjustable elevating-stanchion affixed.

The same letters refer to the same things in all the designs.

A are the slats; B, the end bed-pieces overlapping; C, the side bed-pieces overlapping; D, a clasp to hold together and fasten the overlapping pieces in position; E, collar or tube; F, two rods sliding into the collar; G, two rods extending past each other at one end of the frame; H, the elastic cord on which the slats are suspended; I, the rings through which the cord may be passed; J, stanchion to support the collar E; K, the sliding stanchion set on the slats, and L nuts. The design of this is that the bed spring-bottom shall fit any bedstead. To this end the base strips B and C overlap and may be fastened any way. I use a clamp or collar, D, and insert a wedge.

To prevent the cord H (coiled around the rods G) drawing them together, nuts L are screwed on, and against these the ends of the opposite bars rest; or a wedge is put in the collar E to prevent that end coming together.

The slats are supported on an elastic cord, H, and this passes through rings I, which can be adjusted to any width of frame by sliding along the rod, or the cord may be coiled round the rods and the slat put through under.

When it is necessary to set the slats above the rods F and G an adjustable stanchion, K, is slipped on and fastened any way. Thus every part of the spring bed-bottom is adjustable to the varying sizes of bedsteads.

What I claim as my invention, and desire to secure by Letters Patent, is—

1. The combination of the elastic cord passed through the rings with the rods and tube, for the purpose of making an elastic suspension of the slats upon an extensible frame, in the manner substantially as above described.

2. The combination of the movable stanchion with and resting upon the elastic cord coiled around a transverse bar, in the manner substantially as above described.

JOSHUA BARNES.

Witnesses:
O. G. WARREN,
J. D. STURTEVANT.